United States Patent [19]
Nordstrom et al.

[15] 3,650,813
[45] Mar. 21, 1972

[54] ACRYLIC-SILOXANE RESIN PAINT II
[72] Inventors: John D. Nordstrom, Detroit; Carolyn B. Zelek, Ypsilanti, both of Mich.
[73] Assignee: Ford Motor Company, Dearborn, Mich.
[22] Filed: Dec. 24, 1969
[21] Appl. No.: 888,058

[52] U.S. Cl.................117/93.31, 117/124 F, 117/132 BS, 117/138.8 A, 117/148, 117/161 ZA, 204/159.13, 260/827
[51] Int. Cl..........................................B44d 1/50
[58] Field of Search...............117/93.31, 161 ZA, 132 BS, 117/124 F, 138.8 A, 121, 148; 204/159.13, 159.16; 260/46.5 Y, 827

[56] References Cited

UNITED STATES PATENTS 3,075,941  1/1963  Wynstra et al. ...................117/132 BS
3,437,512  4/1969  Burlant et al. ....................117/93.31
3,536,779  10/1970  Bedikian et al. ..................117/161 ZA Primary Examiner—Alfred L. Leavitt
Assistant Examiner—J. H. Newsome
Attorney—John Faulkner and Olin B. Johnson

[57] ABSTRACT

A novel acrylic-siloxane paint binder resin that is crosslinkable with vinyl monomers by exposure to an electron beam is produced in a two step reaction wherein (1) a siloxane having two or more hydroxy or alkoxy functional groups per molecule is reacted with a hydroxy functional copolymer of acrylic monomers, and (2) the siloxane-comprising reaction product of the first reaction step is reacted with a $C_5$ - $C_{12}$ monohydroxy acrylate, e.g., the monoester of a $C_2$ - $C_8$ diol and acrylic or methacrylic acid.

18 Claims, No Drawings

ACRYLIC-SILOXANE RESIN PAINT II

BACKGROUND OF THE INVENTION

Electron-curable, siloxane-acrylate reaction products are disclosed in the copending U.S. Pat. application Ser. No. 776,779, filed Nov. 18, 1969, by John D. Nordstrom, coinventor herein.

Electron-curable, siloxane-modified polyester paints have been disclosed by W. J. Burlant and I. H. Tsou in the U.S. Pat. Nos. 3,437,512, and 3,437,513.

It is one object of this invention to provide siloxane-comprising paints curable by electron-beam radiation which exhibit improved adhesion to the substrate upon which they are cured.

It is another object of this invention to provide siloxane-comprising paints curable by electron-beam radiation which can be tailored to varying degrees of flexibility.

THE INVENTION

It has been discovered that improved adhesion, weatherability, and flexibility of paint film is obtained in an electron-beam cured coating comprising in combination vinyl monomers and a novel alpha-beta olefinically unsaturated acrylic-siloxane resin hereinafter described in detail. Thus, this invention relates to painted articles of manufacture wherein the painted surface has high resistance to weathering, improved flexibility, improved adhesion to substrate, and improved curability, with the process of producing such painted surface, with the paint used in such process, and with a method for manufacturing the novel paint binder resin used in paint. In particular, this invention is concerned with the painting of substrates of wood, glass, metal, polymeric solids and fabrics of synthetic or natural fibers and the curing of novel paints thereon.

The novel acrylic-siloxane paint binder resins of this invention are prepared in a two step reaction wherein (1) a siloxane having two or more hydroxy or alkoxy functional groups per molecule is reacted with a hydroxy functional copolymer of acrylic monomers, and (2) the siloxane-comprising reaction product of the first reaction step is reacted with a $C_5$–$C_{12}$ monohydroxy acrylate, e.g., the monoester of a $C_2$–$C_8$ diol and acrylic or methacrylic acid.

In this application, the term "paint" is meant to include pigment and/or particulate filler, the binder without pigment and/or filler or having very little of the same, which can be tinted if desired. Thus, the binder which is ultimately converted to a durable film resistant to weathering, can be all or virtually all that is used to form the film, or it can be a vehicle for pigment and/or particulate filler material.

The siloxanes employed in the preparation of the binder have a reactive hydroxyl or an alkoxy group, advantageously a $C_1$–$C_4$ and preferably a $C_1$ to $C_2$ alkoxy group, bonded to at least two of its silic-n atoms. The term "siloxane" as employed herein refers to a compound containing at

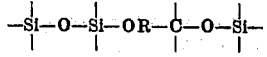

linkage, with the remaining valences being satisfied by a hydrocarbon radical, a hydrocarbonoxy radical, hydrogen, a hydroxyl group, or an oxygen atom which interconnects the silicon atom providing such valence with another silicon atom. The siloxane may be either cyclic or acyclic. Suitable cyclic and acyclic siloxanes for use in this invention are described and illustrated in the aforementioned patents to W. J. Burlant and I. H. Tsou and elsewhere in the literature. The preferred siloxanes contain two to five hydroxy and/or alkoxy functional groups. The choice of reactants is advantageously arranged so that the siloxane comprises about 10 to about 50 weight percent of the binder resin produced in the two step reaction process.

The acrylic resin reactant, i.e., the hydroxy functional copolymer of acrylic monomers is prepared by copolymerizing various acrylic monomers and contains about 0.2 to about 2, preferably about 0.5 to 1.5, reactive hydroxyl groups per 1,000 units molecular weight. These are advantageously provided in the copolymer by having as one reactant a monohydroxy acrylate or methacrylate, e.g., the monohydroxy ester of $C_2$–$C_8$ diol and acrylic or methacrylic acid. These include 2-hydroxyethyl acrylate or methacrylate, 2-hydroxypropyl acrylate or methacrylate, 2-hydroxybutyl acrylate or methacrylate, 2-hydroxyoctyl acrylate or methacrylate, etc. The balance of the comonomers are preferably esters of $C_1$–$C_8$ monohydric alcohols and acrylic or methacrylic acid, e.g., methyl methacrylate, ethyl acrylate, butyl acrylate, butyl methacrylate, 2-ethyl hexyl acrylate, etc. The co-monomers used to prepare this resin may also include minor proportions of other vinyl monomers with a major proportion of the aforementioned esters of $C_1$–$C_8$ monohydric alcohols and acrylic or methacrylic acid. Such minor component monomers may include acrylic acid, methacrylic acid, glycidyl acrylate, glycidyl methacrylate, and/or vinyl hydrocarbons, e.g., styrene vinyl toluene, alpha-methyl styrenes, etc., and/or acrylonitrile, acrylamide, methacrylonitrile, and/or vinyl halides, e.g., vinyl chloride, and/or vinyl carboxylates, e.g., vinyl acetate. These resins have average molecular weights in the range of about 1,000 to about 25,000, preferably in the range of about 5,000 to about 15,000. The resin may contain alpha-beta unsaturation, as for example, one may include glycidyl acrylate or glycidyl methacrylate as one of the comonomers and then react the resultant prepolymer with acrylic or methacrylic acid.

In the preferred embodiment, the relative proportions of the hydroxylated acrylic resin and the hydroxy or alkoxy functional siloxane are adjusted to yield as nearly as possible a product wherein one functional group of the siloxane is reacted with a hydroxyl group of a resin molecule leaving the remainder of the functional groups of the siloxane to react with hydroxy acrylate in the second step reaction. Since the preferred siloxanes contain two to five functional groups per molecule, the siloxane molecule of the preferred final product resin would have attached thereto one molecule of the acrylic resin and one to four acrylate molecules. However, perfect control is not to be expected and hence the siloxane molecules in the paint binder solution will have attached on average about 0.5 to about 1.5 molecules of the acrylic resin reactant. Thus, the mol ratio of acrylic resin to siloxane in this reaction step is advantageously in the range of 0.5–1.5:1. Sufficient hydroxy acrylate is used in the second step to react with at least a substantial portion, preferably all, of the remaining functional groups of the siloxane. Conversely, the hydroxylated acrylic resin may have a plurality of reactive hydroxyl groups per molecule, advantageously one to 10, and hence a number of siloxane molecules may be attached to one molecule of the acrylic resin reactant.

The acrylate reactant of the second reaction step may be the sole means of providing alpha-beta olefinic unsaturation or the unsaturation it provides may exist alongside alpha-beta unsaturation in the acrylic resin previously reacted with the siloxane. Suitable acrylates include 2-hydroxy acrylate or methacrylate, 2-hydroxypropyl acrylate or methacrylate, 2-hydroxybutyl acrylate or methacrylate, 2-hydroxyoctyl acrylate or methacrylate, etc.

The flexibility of the cured paint film formed from the acrylic-siloxane resin thus produced can be varied significantly by varying the molecular weight of the acrylic copolymer and/or the number of acrylic copolymer molecules per siloxane molecule in the acrylic-siloxane resin.

The acrylic-siloxane resin thus produced is admixed with $C_5$–$C_{12}$ vinyl monomers to form a paint binder solution which is applied by conventional means, e.g., spraying, roll coating, etc., to a substrate and polymerized thereon with ionizing radiation, preferably that of an electron beam having average energy in the range of about 100,000 to about 500,000, preferably about 150,000 to about 350,000 electron volts.

The vinyl monomers employed in solution with the acrylic-siloxane resin are preferably acrylic monomers, e.g., methyl methacrylate, ethyl acrylate, butyl acrylate, butyl methacrylate, 2-ethyl hexyl acrylate, the hydroxy acrylates previously mentioned for use in the resin preparations, etc., or a mixture of such acrylic monomers and vinyl hydrocarbon monomers, e.g., styrene, and alkylated styrenes such as vinyl toluene, alpha-methyl styrenes, divinyl benzene, etc. Vinyl hydrocarbons can be used alone as the vinyl monomer component of the paint binder. In combination with the monoacrylates and/or hydrocarbon monomers, one can also use a minor proportion of di-, tri-, or tetrafunctional acrylates. Also, in combination with acrylates and methacrylates and/or vinyl hydrocarbons, there can be used minor amounts of other vinyl monomers such as acrylontrile, acrylamide, methacrylonitrile, vinyl halides, e.g., vinyl chloride, and vinyl carboxylates, e.g., vinyl acetate.

In preparing the paints of this invention, the alpha-beta olefinically unsaturated resin component, i.e., the acrylic-siloxane resin, may comprise up to about 80 weight percent of the paint binder solution on a pigment and particulate filler free basis and as low as about 20 weight percent. Preferably, the resin comprises about 35 to 65 weight percent of resin-monomer solution with the vinyl monomers comprising about 65 to about 35 weight percent of the same. It will be understood that other alpha-beta olefinically unsaturated polymers may be substituted for a minor portion of the acrylic-siloxane paint binder resin of this invention.

The abbreviation "Mrad," as employed herein, means 1,000,000 rad. The term "rad," as employed herein, means that the dose of radiation which results in the absorption of 100 ergs of energy per gram of absorber, e.g., coating film. The electron emitting means may be a linear electron accelerator capable of producing a direct current potential in the range hereinbefore set forth. In such a device, electrons are ordinarily emitted from a hot filament and accelerated through a uniform voltage gradient. The electron beam, which may be about one-eighth inch diameter at this point, is then scanned in one direction to make a fan-shaped beam and then passed through a metal window, e.g., aluminum, aluminum alloyed with a small amount of copper, a magnesium-thorium alloy, of about 0.003 inch thickness.

The binder is preferably applied to the substrate and cured thereon as a continuous film of substantially even depth preferably a depth in the range of about 0.1 to about 4.0 mils depending upon the substrate and the intended use of the coated product. The film-forming binder solution should have a viscosity low enough to permit rapid application to the substrate in substantially even depth and preferably, high enough so that a 1 mil (0.001 inch) film will hold upon a vertical surface without sagging. The viscosity of the binder is adjusted by varying the relative concentrations of the resin component and/or by varying the relative concentrations of dissimilar monomers within the vinyl monomer component. The binder is preferably applied to the substrate essentially free of non-polymerizable organic solvents and/or diluents, although suitably volatile solvents can be used and flashed off prior to curing.

This invention will be more fully understood from the following illustrative examples:

EXAMPLE 1

An acrylic-siloxane resin is prepared in the following manner:

1. An acrylic resin, Resin I, is prepared from 80 mol percent ethyl acrylate, 10 mol percent hydroxyethyl acrylate and 10 mol percent glycidyl methacrylate. The copolymerization is effected by dropwise addition of the monomers, with 1.5 weight percent azobisisobutyronitrile, to an equivalent weight of refluxing xylene. When the reaction is complete, acrylic acid in equimolar ratio with the glycidyl methacrylate is added and reacted with the resin.
2. Step I Reaction-Resin I is reacted with Siloxane:

| Reactants | Parts by Wt. |
| --- | --- |
| Resin I | 75 (0.07 mol hydroxyl |
| Hydroxy Functional Cyclic Siloxane (1) | 100 (0.07 mol hydroxyl |
| Xylene | 120 |
| Hydroquinone | 0.1 |

1. A commercially available Dow Corning Z-6018) hydroxy-functional, cyclic, poly-siloxane having the following properties: Hydroxy content, Dean Stark:

| | | |
| --- | --- | --- |
| Percent condensable | | 5.5 |
| Percent free | | 0.5 |
| Average molecular weight | | 1600 |
| Combining weight | | 400 |
| Refractive index | 1.531 | −1.539 |
| Softening point, Durran's Mercury method, degrees F | | 200 |
| At 60% solids in xylene Specific gravity at 77° F. | | 1.075 |
| Viscosity at 77° F., centipoises | | 33 |
| Gardner-Holdt | | A−1 |

PROCEDURE

The reactants are heated at reflux (142° C.) for one hour. The by-product, water, is removed by azeotropic distillation. The product, Resin II, is a slightly hazy, viscous liquid.

3. Step II Reaction-Resin II is reacted with Hydroxy Acrylate:

| Reactants | Parts by Wt. |
| --- | --- |
| Resin II | 209 |
| Hydroxyethyl Acrylate | 11.5 |

The reactants are heated at reflux for 2 hours. Water of condensation is removed by azeotropic distillation. Sixty-five (65) parts by weight of the resultant acrylic-siloxane resin with thirty-five (35) parts by weight methyl methacrylate and a film of this solution is drawn down on a steel panel. A continuous non tacky film is formed when this coating is exposed to a 275 kilovolt, 25 milliampere electron beam.

EXAMPLE 2

An acrylic-siloxane resin is prepared by the methods of Example 1 with the differences that functionally equivalent amounts of a different acrylic resin and a methoxy functional siloxane are substituted for the acrylic resin and the siloxane employed in Example 1. A catalytic amount (0.4 part by weight) tetraisopropyl titanate is employed as a catalyst.

The acrylic resin employed in this example is prepared by copolymerizing a mixture of monomers whose composition is 40 mol percent methyl methacrylate, 50 mol percent ethyl acrylate and 10 mol percent hydroxyethyl acrylate. The copolymerization is effected by dropwise addition of the monomers with 1.5 weight percent azobisisobutyronitrile to an equivalent weight of refluxing xylene.

The siloxane employed in this example is an acyclic polysiloxane having an average molecular weight in the range of 700–800 with an average of three to four methoxy functional groups per molecule.

The resultant acrylic-siloxane resin (65 parts by weight) and methyl methacrylate (35 parts by weight) are mixed to form a paint binder solution. A film of this solution is drawn down on a steel panel and cured to a tack free state by exposure to 8 Mrads of energy from a 275 kilovolt, 25 milliampere electron beam in a nitrogen atmosphere.

EXAMPLE 3

The procedure of Example 2 is repeated except for the difference that the hydroxy acrylate employed in the second reaction step is 2-hydroxyethyl methacrylate.

EXAMPLE 4

The procedure of Example 2 is repeated except for the difference that the hydroxy acrylate employed in the second reaction step is 2-hydroxybutyl acrylate.

EXAMPLE 5

The procedure of Example 2 is repeated except for the difference that the hydroxy acrylate employed in the second reaction step is 2-hydroxybutyl methacrylate.

EXAMPLE 6

The procedure of Example 2 is repeated except for the differences that the hydroxy acrylate employed in the second reaction step is 2-hydroxyoctyl acrylate and the average depth of the film applied and cured is about 0.2 mil.

EXAMPLE 7

The procedure of Example 2 is repeated except for the differences that the hydroxy acrylate employed in the second reaction step is 2-hydroxyoctyl methacrylate and the average depth of the film applied and cured is about 4 mils.

EXAMPLE 8

The procedure of Example 2 is repeated except for the differences that the paint binder solution contains 80 parts by weight of the acrylic-siloxane resin and 20 parts by weight methyl methacrylate, the substrate is glass and curing is effected by exposure to a 295 kilovolt, 25 milliampere electron beam.

EXAMPLE 9

The procedure of Example 2 is repeated except for the differences that the paint binder solution contains 20 parts by weight of the acrylic-siloxane resin and 80 parts by weight of an equimolar mixture of methyl methacrylate, styrene, ethyl acrylate, butyl acrylate and 2-ethyl hexyl acrylate, the substrate is wood, and curing is effected by exposure to a 325 kilovolt, 25 milliampere electron beam.

EXAMPLE 10

The procedure of Example 2 is repeated except for the differences that the paint binder solution contains 35 parts by weight of the acrylic-siloxane resin and 65 parts by weight of a mixture of two molar parts methyl methacrylate, one molar part ethyl acrylate, one-half molar part vinyl toluene, one-half molar part divinyl benzene, one-half molar part vinyl acetate and one-half molar part butyl methacrylate, the substrate is a polymeric solid, i.e., acrylonitrile-butadiene-styrene copolymer.

EXAMPLE 11

The procedure of Example 2 is repeated except for the differences that the vinyl monomer component is a mixture of four molar parts methyl methacrylate, one molar part vinyl acetate, one-half molar part 2-hydroxyethyl acrylate and one-half molar part vinyl chloride and the substrate is cotton fabric.

EXAMPLE 12

The procedure of Example 2 is repeated with the difference that the paint binder solution is pigmented with particulate titanium dioxide.

It will be understood by those skilled in the art that changes can be made in the foregoing examples without departing from the spirit and scope of this invention, as expressed in the appended claims.

We claim:

1. An article of manufacture comprising a substrate and an adherent coating of paint on an external surface thereof, said coating comprising the in situ formed polymerization product of a film-forming solution of 20 to 80 parts by weight vinyl monomers and 80 to 20 parts by weight of an alpha-beta olefinically unsaturated acrylic-siloxane resin applied to said surface as a paint film and crosslinked thereon by exposing said film to ionizing radiation, said acrylic-siloxane resin being formed by:

1. reacting by etherification one molar amount of a siloxane resin having at least two functional groups per molecule selected from hydroxyl groups and alkoxy groups with about 0.5 to about 1.5 molar amounts of a copolymer of vinyl monomers, said copolymer being characterized in that
      a. at least one constituent monomer thereof is a $C_5$–$C_{12}$ monohydroxy ester of a $C_2$–$C_8$ dihydric alcohol and acrylic or methacrylic acid,
      b. at least one constituent monomer thereof is a $C_4$–$C_{12}$ alkyl ester of a $C_1$–$C_8$ monohydric alcohol and acrylic or methacrylic acid, and
      c. it contains about 0.2 to about two hydroxyl groups per 1,000 units molecular weight, and
   2. reacting by etherification the resultant resin with a $C_5$–$C_{12}$ monohydroxy ester of $C_2$–$C_8$ dihydric alcohol and acrylic or methacrylic acid employed in an amount sufficient to react with at least a substantial portion of the unreacted hydroxy or alkoxy groups of said siloxane.

2. An article of manufacture in accordance with claim 1 wherein said siloxane is a hydroxy functional siloxane.

3. An article of manufacture in accordance with claim 1 wherein said siloxane is a methoxy functional siloxane.

4. An article of manufacture in accordance with claim 1 wherein said siloxane has two to five functional groups per molecule, said functional groups being selected from hydroxyl groups of methoxy groups.

5. An article of manufacture in accordance with claim 1 wherein said substrate is wood.

6. An article of manufacture in accordance with claim 1 wherein said substrate is synthetic polymeric solid.

7. An article of manufacture in accordance with claim 1 wherein said substrate is glass.

8. An article of manufacture in accordance with claim 1 wherein said substrate is fabric.

9. An article of manufacture in accordance with claim 1 wherein said substrate is metal.

10. A paint comprising particulate pigment and a film-forming solution consisting essentially of 20 to 80 parts by weight vinyl monomers and 80 to 20 parts by weight of an acrylic-siloxane resin applied to said surface as a paint film and crosslinked thereon by exposing said film to ionizing radiation, said acrylic-siloxane resin being formed by:

1. reacting by etherification one molar amount of a siloxane resin having at least two functional groups per molecule selected from hydroxyl groups and alkoxy groups with about 0.5 to about 1.5 molar amounts of copolymer of vinyl monomers, said copolymer being characterized in that
      a. at least one constituent monomer thereof is a $C_5$–$C_{12}$ monohydroxy ester of a $C_2$–$C_8$ dihydric alcohol and acrylic or methacrylic acid.
      b. at least one constituent monomer thereof is a $C_4$–$C_{12}$ alkyl ester of a $C_1$–$C_8$ monohydric alcohol and acrylic or methacrylic acid, and
      c. it contains about 0.2 to about two hydroxyl groups per 1,000 units molecular weight, and
   2. reacting the resultant resin with a $C_5$–$C_{12}$ monohydroxy ester of a $C_2$–$C_8$ dihydric alcohol and acrylic or methacrylic acid employed in an amount sufficient to react with at least a substantial portion of the unreacted hydroxy or alkoxy groups of said siloxane.

11. A paint in accordance with claim 10 wherein said copolymer contains one to 10 reactive hydroxyl groups per molecule.

12. A paint in accordance with claim 10 wherein said copolymer contains between about 0.5 and about 1.5 hydroxyl groups per 1,000 units molecular weight.

13. A paint in accordance with claim 10 wherein said siloxane has two to five functional groups per molecule, said functional groups being selected from hydroxyl groups and methoxy groups.

14. A paint in accordance with claim 10 wherein said vinyl monomers consist essentially of esters of acrylic or methacrylic acid and $C_1$ to $C_8$ alcohol.

15. A paint in accordance with claim 10 wherein said vinyl monomers consist essentially of a mixture of $C_8$ to $C_{10}$ vinyl hydrocarbons and esters of acrylic or methacrylic acid and a $C_1$ to $C_8$ alcohol.

16. A paint in accordance with claim 10 wherein said film-forming solution consists essentially of 35 to 65 parts by weight of said acrylic-siloxane resin and 65 to 35 parts by weight of vinyl monomers. crosslinking 17. A method for coating a substrate which comprises applying to the surface of said substrate to an average depth in the range of about 0.1 to about 4 mils of film-forming solution consisting essentially of 20 to 80 parts by weight vinyl monomers and 80 to 20 parts by weight of an alpha-beta olefinically unsaturated acrylic-siloxane resin and cross-linking said vinyl monomers and said resin upon said surface by exposing said coating to an electron beam having average energy in the range of about 100,000 to about 500,000 volts, said acrylic-siloxane resin formed by:
  1. reacting by etherification one molar amount of a siloxane having at least two functional groups per molecule selected from hydroxyl groups and alkoxy groups with about 0.5 to about 1.5 molar amounts of a copolymer of vinyl monomers, said copolymer being characterized in that
    a. at least one constituent monomer thereof is a $C_5-C_{12}$ monohydroxy ester of a $C_2-C_8$ dihydric alcohol and acrylic or methacrylic acid,
    b. at least one constituent monomer thereof is a $C_4-C_{12}$ alkyl ester of a $C_1-C_8$ monohydric alcohol and acrylic or methacrylic acid, and
    c. it contains about 0.2 to about two hydroxyl groups per 1,000 units molecular weight, and
  2. reacting by etherification the resultant resin with a $C_5-C_{12}$ monohydroxy ester of a $C_2-C_8$ dihydric alcohol and acrylic or methacrylic acid employed in an amount sufficient to react with at least a substantial portion of the unreacted hydroxy or alkoxy groups of said siloxane.

18. An acrylic-siloxane resin formed by (1) reacting by etherification one molar amount of a siloxane having at least two functional groups per molecule selected from hydroxyl groups and alkoxy groups with about 0.5 to about 1.5 molar amounts of a copolymer of vinyl monomers, said copolymer being characterized in that:
  a. at least one constituent monomer thereof is a $C_5-C_{12}$ monohydroxy ester of a $C_2-C_8$ dihydric alcohol and acrylic or methacrylic acid,
  b. at least one constituent monomer thereof is a $C_4-C_{12}$ alkyl ester of a $C_1-C_8$ monohydric alcohol and acrylic or methacrylic acid, and
  c. it contains about 0.2 to about two hydroxyl groups per 1,000 units molecular weight, and
  2. reacting the resultant resin with a $C_5-C_{12}$ monohydroxy ester of a $C_2-C_8$ dihydric alcohol and acrylic or methacrylic acid employed in an amount sufficient to react with at least a substantial portion of the untreated hydroxy or alkoxy groups of said siloxane.

* * * * *